(12) United States Patent
Han et al.

(10) Patent No.: US 10,184,418 B2
(45) Date of Patent: Jan. 22, 2019

(54) DEVICE OF PREDICTING PRESSURE OF DIESEL ENGINE AND PRESSURE PREDICTING METHOD USING THE SAME

(71) Applicants: Hyundai Motor Company, Seoul (KR); Seoul National University R&DB Foundation, Seoul (KR)

(72) Inventors: Kyoungchan Han, Gunpo-si (KR); Jun Yu, Suwon-si (KR); Kyoung Min Lee, Hwaseong-si (KR); Kyoungdoug Min, Seoul (KR); Seungha Lee, Gwacheon-si (KR); Youngbok Lee, Incheon (KR)

(73) Assignees: Hyundai Motor Company, Seoul (KR); Seoul National University R&DB Foundation, Seoul (KR)

( * ) Notice: Subject to any disclaimer, the term of this patent is extended or adjusted under 35 U.S.C. 154(b) by 66 days.

(21) Appl. No.: 15/377,533

(22) Filed: Dec. 13, 2016

(65) Prior Publication Data
US 2018/0023505 A1    Jan. 25, 2018

(30) Foreign Application Priority Data

Jul. 19, 2016   (KR) ........................ 10-2016-0091357

(51) Int. Cl.
*F02D 41/40*   (2006.01)
*F02D 41/14*   (2006.01)
*F02D 35/02*   (2006.01)

(52) U.S. Cl.
CPC ......... *F02D 41/403* (2013.01); *F02D 35/024* (2013.01); *F02D 35/028* (2013.01); *F02D 41/1475* (2013.01); *F02D 2200/0414* (2013.01); *F02D 2200/0616* (2013.01); *F02D 2250/32* (2013.01); *F02D 2700/0282* (2013.01)

(58) Field of Classification Search
CPC .................................................. F02D 41/403
See application file for complete search history.

(56) References Cited

U.S. PATENT DOCUMENTS

| 7,765,979 B2 | 8/2010 | Vermonet et al. |
| 2016/0305356 A1* | 10/2016 | Iwata .................... F02D 41/403 |
| 2017/0167350 A1* | 6/2017 | Han .................... G01N 33/0037 |

FOREIGN PATENT DOCUMENTS

| JP | 2003-155949 A | 5/2003 |
| JP | 4600308 B2 | 12/2010 |
| JP | 2012-082766 A | 4/2012 |
| JP | 4976963 B2 | 7/2012 |
| JP | 2014-137004 A | 7/2014 |
| KR | 10-1316281 B1 | 10/2013 |

OTHER PUBLICATIONS

JP2012-082766 Apr. 2012 Machine translation.*

* cited by examiner

*Primary Examiner* — Hieu T Vo
*Assistant Examiner* — Arnold Castro
(74) *Attorney, Agent, or Firm* — Morgan, Lewis & Bockius LLP

(57) ABSTRACT

A method of predicting a cylinder pressure of a diesel engine by a pressure predicting device may include predicting a pilot injection combustion pressure by pilot injection; predicting main combustion duration of main injection; and predicting a main injection combustion pressure after the main injection by using the pilot injection combustion pressure and the main combustion duration.

17 Claims, 7 Drawing Sheets

DEVICE OF PREDICTING PRESSURE OF DIESEL ENGINE AND PRESSURE PREDICTING METHOD USING THE SAME

CROSS-REFERENCE TO RELATED APPLICATION

The present application claims priority to Korean Patent Application No. 10-2016-0091357 filed on Jul. 19, 2016, the entire contents of which is incorporated herein for all purposes by this reference.

BACKGROUND OF THE INVENTION

Field of the Invention

The present invention relates to a device of predicting a pressure of a diesel engine and a pressure predicting method using the same.

Description of Related Art

As regulations regarding contaminants emission allowance from a vehicle having an internal combustion engine have gradually tightened up, emission of contaminants are required to be maintained as small as possible while the internal combustion engine operates. One of methods for reducing the emission of the contaminants is to reduce the emission of the contaminants generated while a mixture of air and fuel is combusted in each cylinder of the internal combustion engine.

The other one among the methods is to use an exhaust gas postprocessing system in the internal combustion engine. The exhaust gas postprocessing system converts the contaminants generated during combustion of the mixture of the air and the fuel into harmless materials in each cylinder. For such a purpose, catalyst converters are used, which convert carbon monoxide, hydrocarbon, and nitrogen oxide into the harmless materials.

In order to efficiently convert contaminant components by using the exhaust gas catalyst converter, the amount of the nitrogen oxide generated from the engine, that is, NOx (nitrogen oxides) needs to be accurately measured.

In the related art, an exhaust gas analysis device or a sensor for measuring the NOx is separately provided in order to predict the amount of NOx. However, when the exhaust gas analysis device or the NOx measuring sensor is separately provided, cost increases and composites in engine exhaust gas contaminates the exhaust gas analysis device or NOx sensor, and as a result, the sensor itself malfunctions.

Further, since a cylinder pressure is predicted by using a separate pressure sensor in the related art, the cost increases.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a device of predicting a pressure of a diesel engine and a pressure predicting method using the same, which can predict a cylinder pressure of the diesel engine without a pressure sensor.

Various aspects of the present invention are directed to providing a method of predicting a cylinder pressure of a diesel engine by a pressure predicting device, including: predicting a pilot injection combustion pressure by pilot injection; predicting main combustion duration of main injection; and predicting a main injection combustion pressure after the main injection by using the pilot injection combustion pressure and the main combustion duration.

The predicting of the main combustion duration may include predicting an ignition delay time from an injection time of the main injection up to a combustion start time, and deriving the main combustion duration from the combustion start time up to a combustion end time of the main injection.

The predicting of the main injection combustion pressure may include predicting a main combustion start pressure at the combustion start time by using the pilot injection combustion pressure and the ignition delay time.

The predicting of the main injection combustion pressure may further include deriving the main injection combustion pressure after the main injection by using a Wiebe function and deriving a maximum combustion pressure of the main injection at the combustion end time.

The predicting of the pilot injection combustion pressure may include predicting a pressure before the pilot injection by using an engine driving variable, and deriving the pilot injection combustion pressure by using the pressure before the pilot injection and the Wiebe function.

In the predicting of the pressure before the pilot injection, a specific heat ratio which varies depending on an engine driving condition may be predicted by using the engine driving variable and the pressure before the pilot injection may be derived by using the predicted specific heat ratio.

The engine driving variable may include at least one of a boost pressure, an intake manifold temperature, an EGR, an air-fuel ratio (AF), a total fuel amount, a pilot fuel amount, a pilot injection time, a pilot injection duration, a main injection time, and a swirl ratio.

The method may further include controlling at least one of the engine driving variables by using the main injection combustion pressure by the main injection.

Various aspects of the present invention are directed to providing a device of predicting a pressure of a diesel engine, including: a driving variable collecting device collecting engine driving variables of the diesel engine; a pressure predicting device predicting a pressure before pilot injection by using the engine driving variables and predicting a pilot injection combustion pressure by pilot injection and a main injection combustion pressure by main injection; and a control device controlling the main injection combustion pressure after the main injection to be predicted by predicting main combustion duration of the main injection.

The engine driving variable may include at least one of a boost pressure, an intake manifold temperature, an EGR, an air-fuel ratio (AF), a total fuel amount, a pilot fuel amount, a pilot injection time, a pilot injection duration, a main injection time, and a swirl ratio.

The control device may control at least one of the engine driving variables by using the main injection combustion pressure.

The control device may include an ignition delay time predicting device predicting an ignition delay time from an injection time of the main injection up to a combustion start time.

The control device may further include a combustion duration predicting device predicting the main combustion duration from the combustion start time up to a combustion end time of the main injection.

The pressure predicting device may include a pilot injection combustion pressure predicting device predicting the pilot injection combustion pressure by using a pressure before the pilot injection, and a main injection combustion pressure predicting device predicting a main injection combustion pressure by the main injection.

The pilot injection combustion pressure predicting device may predict a specific heat ratio which varies depending on an engine driving condition by using the engine driving variable and derive the pressure before the pilot injection by using the predicted specific heat ratio.

The main injection combustion pressure predicting device may derive a main combustion start pressure at the combustion start time by using the pilot injection combustion pressure and the ignition delay time.

The main injection combustion pressure predicting device may derive a maximum combustion pressure of the main injection at the combustion end time by using a Wiebe function.

According to exemplary embodiments of the present invention, a cylinder pressure before pilot injection is predicted by using a specific heat ratio which varies according to an engine driving condition and the cylinder pressure by the pilot injection and main injection is predicted by using a Wiebe function to provide an environment which can predict the cylinder pressure of a diesel engine in real time without a separate pressure sensor.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
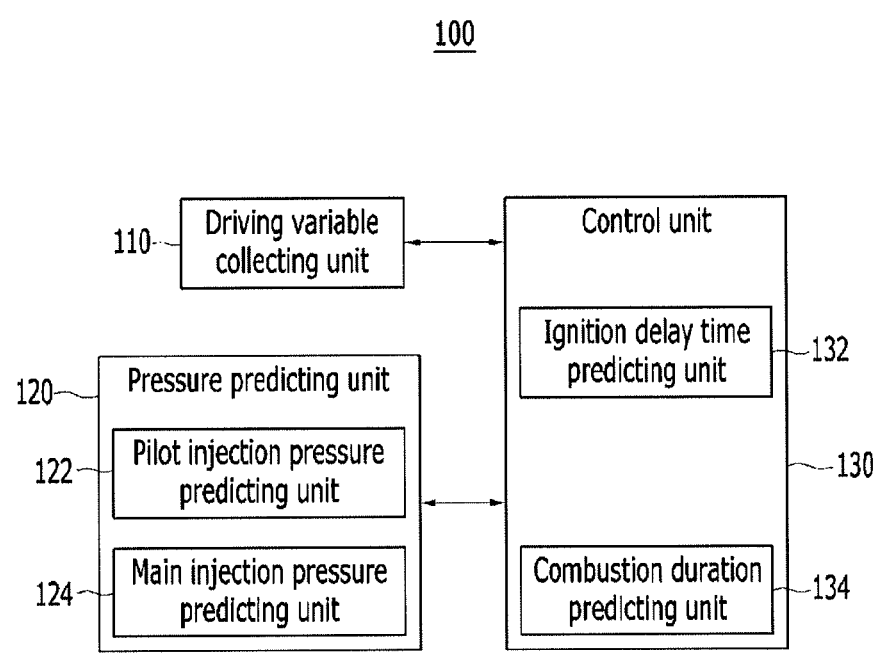
FIG. 1 is a diagram schematically illustrating a structure of a device of predicting a pressure of a diesel engine according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Throughout the specification, unless explicitly described to the contrary, the word "comprise" and variations such as "comprises" or "comprising", will be understood to imply the inclusion of stated elements but not the exclusion of any other elements.

Like reference numerals designate like elements throughout the specification.

"Vehicle", "car", "vehicular", "automobile", or other similar terms used in the present specification include cars including sports utility vehicles (SUV), buses, trucks, and various commercial vehicles, ships including various types of boats or vessels, airplanes, and automobiles including things similar thereto and include a hybrid vehicle, an electric vehicle, a plug-in hybrid electric vehicle, a hydrogen fuel vehicle, and other alternative fuel (e.g., fuel acquired from resources other than petroleum) vehicles.

Additionally some methods may be executed by at least one controller. A term called the controller represents a hardware device including a memory and a processor configured to execute one or more steps analyzed in an algorithm structure. The memory is configured to store algorithm steps and the processor is configured to particularly execute the algorithm steps in order to execute one or more processors disclosed below.

Furthermore, control logic of the present invention may be implemented by a medium which is not temporary and is computer-readable on a computer-readable means including executable program commands executed by the processor, the controller, or a device similar thereto. Examples of the computer-readable means are not limited thereto, but include a ROM, a RAM, a CD-ROM, a magnetic tape, a floppy disk, a flash drive, a smart card, and an optical data storage device. A computer-readable reproducing medium may be stored and executed while being distributed to a computer system connected by a network, for example, in a distribution method by a telematics server or a controller area network (CAN).

Hereinafter, a device of predicting a pressure of a diesel engine and a pressure predicting method using the same according to exemplary embodiments of the present invention will be described in detail with reference to FIGS. 1 to 7.

FIG. 1 is a diagram schematically illustrating a structure of a device of predicting a pressure of a diesel engine according to an exemplary embodiment of the present invention. In this case, only a schematic configuration of the device of predicting a pressure of a diesel engine, which is required for a description according to the exemplary embodiment of the present invention is just illustrated and the device of predicting a pressure of a diesel engine is not limited to such a configuration.

Referring to FIG. 1, a device 100 of predicting a pressure of a diesel engine according to various exemplary embodiments of the present invention includes a driving variable collecting device 110, a pressure predicting device 120, and a control device 130 according to an exemplary embodiment of the present invention.

The driving variable collecting device 110 collects an engine driving variable of the diesel engine and provides the collected engine driving variable information to the control device 130. Herein, the engine driving variable includes at least one of a boost pressure, an intake manifold temperature, an EGR, an air-fuel ratio (AF), a total fuel amount, a pilot fuel amount, a pilot injection time, a pilot injection duration, a main injection time, and a swirl ratio.

The pressure predicting device 120 predicts a pressure before pilot injection by using the engine driving variable. Further, the pressure predicting device 120 predicts a pilot injection combustion pressure by the pilot injection and a main injection combustion pressure by main injection.

The pressure predicting device 120 includes a pilot injection pressure predicting device 122 and a main injection pressure predicting device 124 according to an exemplary embodiment of the present invention.

The pilot injection pressure predicting device 122 predicts the pilot injection combustion pressure by using the pressure before the pilot injection. In the instant case, the pilot injection pressure predicting device 122 may predict the specific heat ratio which varies depending on an engine driving condition by using the engine driving variable and derive the pressure before the pilot injection by using the predicted specific heat ratio.

In addition, the main injection pressure predicting device 124 predicts the main injection combustion pressure by the main injection by using the pilot injection combustion pressure.

The control device 130 controls the pressure before the pilot injection, the pilot injection combustion pressure, and the main injection combustion pressure to be predicted. In the instant case, the control device 130 may control the main injection combustion pressure after the main injection to be predicted by predicting a main combustion duration of the main injection.

The control device 130 controls the engine driving variable by using the main injection combustion pressure by the main injection. The control device 130 may control at least one of the boost pressure, the intake manifold temperature, the EGR, the air-fuel ratio (AF), the total fuel amount, the pilot fuel amount, the pilot injection time, the pilot injection duration, the main injection time, and the swirl ratio by using the main injection combustion pressure.

The control device 130 includes an ignition delay time predicting device 132 and a combustion duration predicting device 124 according to an exemplary embodiment of the present invention.

The ignition delay time predicting device 132 predicts an ignition delay time from an injection time of the main injection up to a combustion start time.

The combustion duration predicting device 124 predicts the main combustion duration from the combustion start time up to a combustion end time of the main injection.

In addition, the main injection pressure predicting device 124 may derive a main combustion start pressure at the combustion start time of the main injection by using the pilot injection combustion pressure and the ignition delay time of the main injection. Further, the main injection pressure predicting device 124 may derive a maximum combustion pressure of the main injection at a combustion end time by using a Wiebe function.

For such a purpose, the control device 130 may be implemented as one or more processors that operate by a set program and the set program may be programmed to perform respective steps of a pressure predicting method according to an exemplary embodiment of the present invention.

Figure 2:
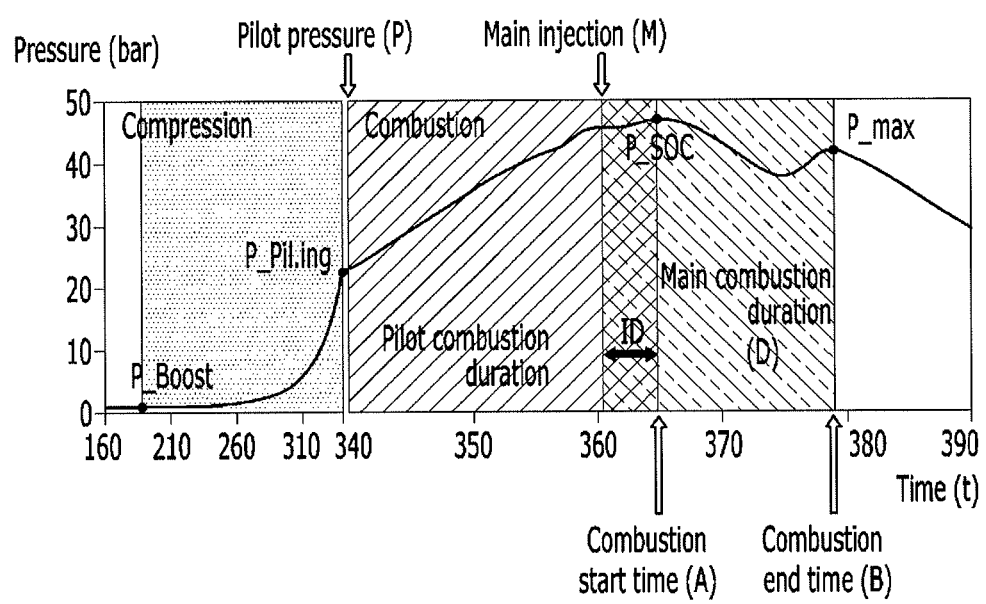
FIG. 2 is a graph illustrating a cylinder pressure predicted with pilot injection and main injection according to an exemplary embodiment of the present invention.

FIG. 2 is a graph illustrating a cylinder pressure predicted with pilot injection and main injection according to an exemplary embodiment of the present invention.

Referring to FIG. 2, the device 100 of predicting a pressure of a diesel engine according to an exemplary embodiment of the present invention predicts the cylinder pressure during the compression process before the pilot injection by using the variable specific heat ratio which varies depending on the engine driving variable.

In addition, the device 100 of predicting a pressure of a diesel engine according to an exemplary embodiment of the present invention predicts the pilot injection combustion pressure after the pilot injection P by using the Wiebe function.

Further, the device 100 of predicting a pressure of a diesel engine according to an exemplary embodiment of the present invention predicts an ignition delay time ID from the injection time M of the main injection up to the combustion start time A and derives the main combustion duration D from the combustion start time A up to the combustion end time B of the main injection.

In addition, the device 100 of predicting a pressure of a diesel engine according to an exemplary embodiment of the present invention predicts the main injection combustion pressure during the main combustion duration D by using the Wiebe function. In the instant case, the device 100 of predicting a pressure of a diesel engine according to an exemplary embodiment of the present invention may predict a main combustion start pressure P_SOC at the combustion start time A by using the pilot injection combustion pressure and the ignition delay time ID.

Further, the device 100 of predicting a pressure of a diesel engine according to an exemplary embodiment of the present invention may derive a maximum combustion pressure P_max of the min injection at the combustion end time B.

Figure 3:
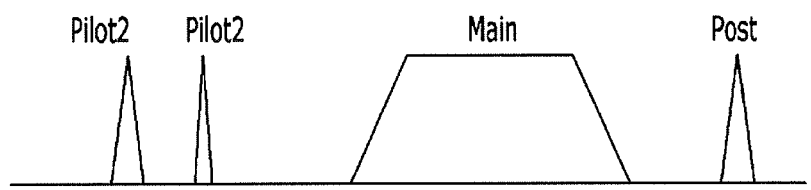
FIG. 3 is a diagram illustrating a fuel injection example of a diesel engine according to an exemplary embodiment of the present invention.

FIG. 3 is a diagram illustrating a fuel injection example of a diesel engine according to an exemplary embodiment of the present invention.

Referring to FIG. 3, in the diesel engine according to an exemplary embodiment of the present invention, pilot injections Pilot1 and Pilot2 before the main injection and post injection after the main injection are used for controlling noise and particular matters (PM) generation amounts. The device 100 of predicting a pressure of a diesel engine according to an exemplary embodiment of the present invention predicts the cylinder pressure before the main injection by using the variable specific heat ratio. In addition, the device 100 of predicting a pressure of a diesel engine according to an exemplary embodiment of the present invention predicts the cylinder pressure after the pilot injections Pilot1 and Pilot2 and the main injection by using the Wiebe function.

Figure 4:
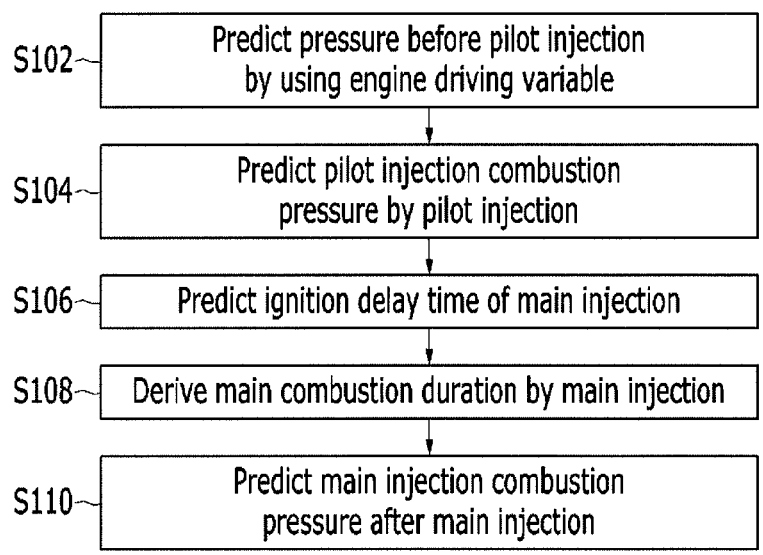
FIG. 4 is a flowchart schematically illustrating a process of predicting a cylinder pressure by a device of predicting a pressure of a diesel engine according to another exemplary embodiment of the present invention.

FIG. 4 is a flowchart schematically illustrating a process of predicting a cylinder pressure by a device of predicting a pressure of a diesel engine according to another exemplary embodiment of the present invention. A flowchart given below will be described by using the same reference numeral in conjunction with the configuration of FIG. 1.

Referring to FIG. 4, the device 100 of predicting a pressure of a diesel engine according to an exemplary embodiment of the present invention predicts the cylinder pressure before the pilot injection by using the engine driving variable (S102). Herein, the engine driving variable includes at least one of the boost pressure, the intake manifold temperature, the EGR, the air-fuel ratio (AF), the total fuel amount, the pilot fuel amount, the pilot injection time, the pilot injection duration, the main injection time, and the swirl ratio.

Figure 5:
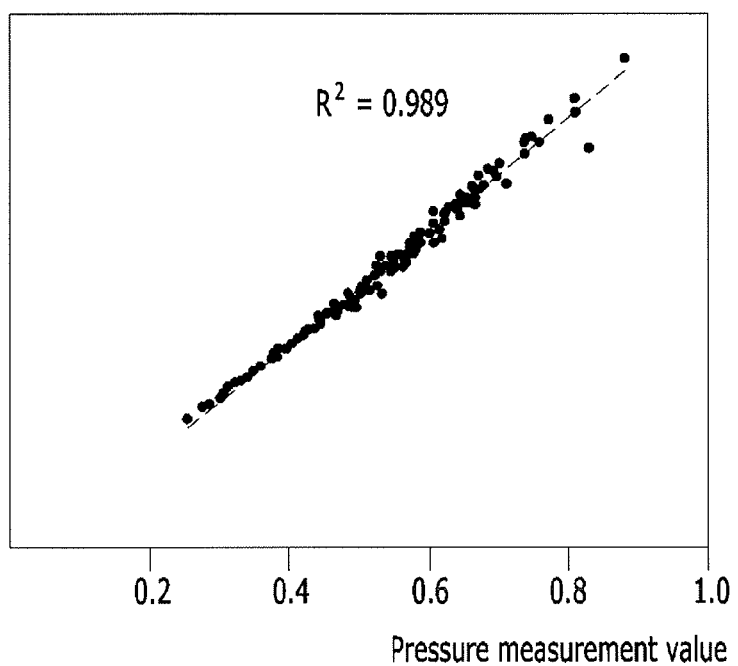
FIG. 5 is a graph illustrating a cylinder pressure predicted by using a variable specific heat ratio during a compression process before pilot injection according to an exemplary embodiment of the present invention.

FIG. 5 is a graph illustrating a cylinder pressure predicted by using a variable specific heat ratio during a compression process before pilot injection according to an exemplary embodiment of the present invention.

The device 100 of predicting a pressure of a diesel engine according to an exemplary embodiment of the present invention predicts the cylinder pressure $P_{pil.inj}$ before the pilot injection through Equation 1 given below.

$$P_{Pil.inj} = P_{boost}\left(\frac{V_{BDC}}{V_{pil.inj}}\right)^k \quad \text{(Equation 1)}$$

$P_{boost}$ represents the boost pressure, $V_{BDC}$ represents a volume at a bottom dead center (BDC) of a piston in the cylinder, and $V_{pil.inj}$ represents a volume in the cylinder at the time when the injection starts. In addition, k represents the variable specific heat ratio which varies depending on the engine driving variable.

Further, the device 100 of predicting a pressure of a diesel engine according to an exemplary embodiment of the present invention predicts the pilot injection combustion pressure by the pilot injection (S104).

Figure 6:
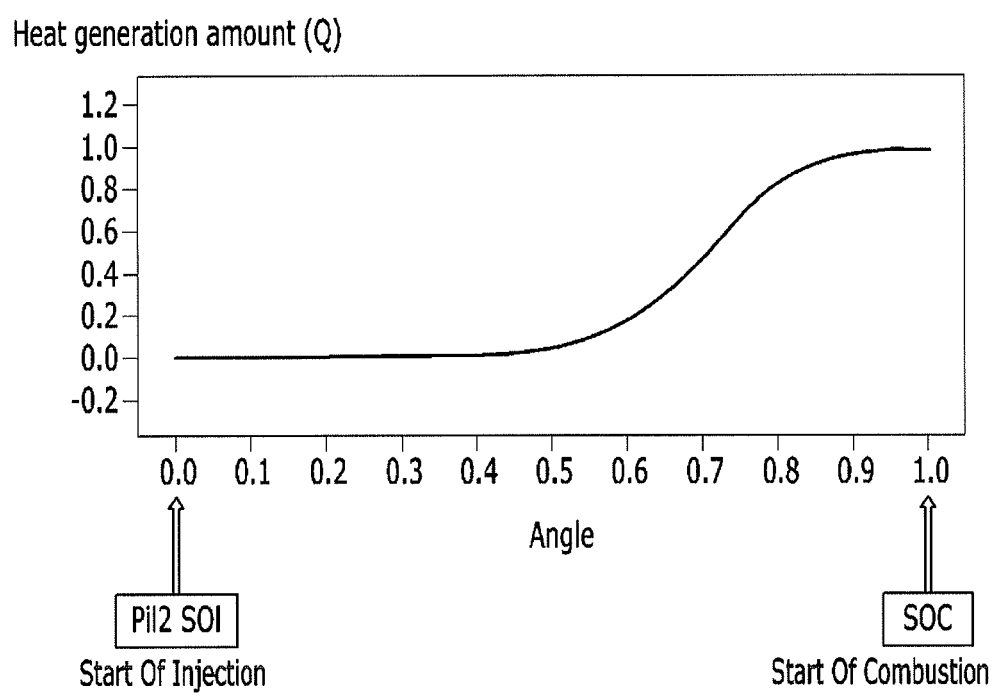
FIG. 6 is a graph for predicting a cylinder pressure by the pilot injection by using a Wiebe function according to an exemplary embodiment of the present invention.

FIG. 6 is a graph for predicting a cylinder pressure by pilot injection by using a Wiebe function according to an exemplary embodiment of the present invention.

Herein, the Wiebe function is a function to drive a heat generation amount depending on a combustion time of fuel. The device 100 of predicting a pressure of a diesel engine according to an exemplary embodiment of the present invention may predict the cylinder pressure by using a differential value of the heat generation amount depending on the combustion time and volume data of the cylinder.

In addition, the device 100 of predicting a pressure of a diesel engine according to an exemplary embodiment of the present invention predicts the cylinder pressure by the pilot injection through Equations 2 to 4 given below.

$$Q\text{norm.} = a\left(1 - \exp\left[-b\left(\frac{\theta}{a}\right)^{c+1}\right]\right) \quad \text{(Equation 2)}$$

$$\frac{dQ}{d\theta} = m_{fuel} * LHV * \quad \text{(Equation 3)}$$

$$\left\{\frac{b(c+1)}{a\Delta\theta}\left(\frac{\theta - \theta_{soc}}{a\Delta\theta}\right)^c (1-a)\left(\exp\left[-b\left(\frac{\theta - \theta_{soc}}{a\Delta\theta}\right)^{c+1}\right]\right)\right\}$$

$$P = \left(\frac{dQ}{d\theta} = \frac{1}{k-1}V\frac{dP}{d\theta}\right)\left(\frac{k-1}{k}\right)\left(\frac{d\theta}{dV}\right) \quad \text{(Equation 4)}$$

Herein, Q norm. as a normalized value represents the heat generation amount at the combustion time, a, b, and c represent constants, and θ represents the combustion time. Further, $m_{fuel}$ represents a fuel amount before the main injection, a low heating value (LHV) represents the heating amount by the fuel amount, and a rate of heat release (ROHR) represents a heat generation rate.

The device 100 of predicting a pressure of a diesel engine according to an exemplary embodiment of the present invention predicts an ignition delay time ID of the main injection (S106).

In the instant case, the ignition delay time ID may be determined by functions including a density, a temperature, an oxygen concentration, and a pilot fuel amount in the cylinder through Equation 5 given below according to an exemplary embodiment of the present invention.

$$ID = a \times \rho_{air,SOI}^b \times \exp\left(\frac{C}{T}\right) \times O_{2,SOI}^d \times Q_{pil}^e \quad \text{(Equation 5)}$$

Further, the device 100 of predicting a pressure of a diesel engine according to an exemplary embodiment of the present invention derives main combustion duration by the main injection (S108).

Herein, the main combustion duration may be determined by functions of the EGR, fuel amounts of the main injection and the post injection, a rail pressure, and the swirl ratio through Equation 6 given below.

Combustion duration=$a \times f(EGR)^b \times Q_{main+post}^c \times P_{Rail}^d \times$ Swirl ratio$^e$ (Equation 6)

In addition, the device 100 of predicting a pressure of a diesel engine according to an exemplary embodiment of the present invention predicts the main injection combustion pressure after the main injection (S110).

Figure 7:
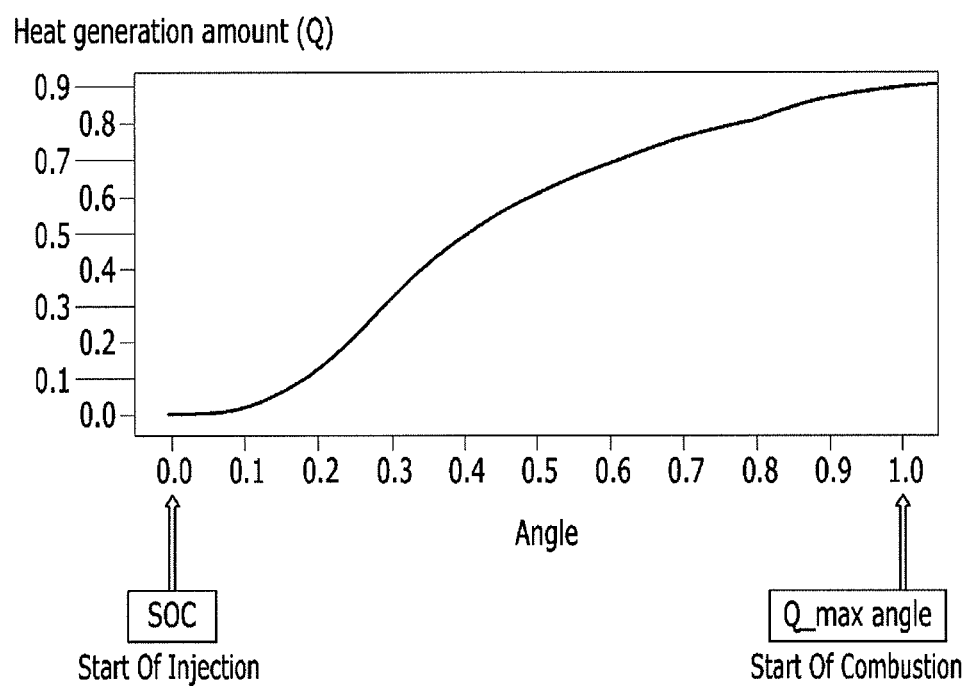
FIG. 7 is a graph for predicting a cylinder pressure by main injection by using the Wiebe function according to an exemplary embodiment of the present invention.

FIG. 7 is a graph for predicting a cylinder pressure by main injection by using the Wiebe function according to an exemplary embodiment of the present invention.

The device 100 of predicting a pressure of a diesel engine according to an exemplary embodiment of the present invention predicts the cylinder pressure by the pilot injection through Equations 7 to 9 given below.

$$Q\text{norm.} = \quad \text{(Equation 7)}$$
$$a\left(1 - \exp\left[-b\left(\frac{\theta - \theta_{soc}}{0.9a}\right)^{c+1}\right]\right) + d\left(1 - \exp\left[-b\left(\frac{\theta - \theta_{soc}}{0.9d}\right)^{e+1}\right]\right)$$

$$\frac{dQ}{d\theta} = m_{fuel} * LHV * \quad \text{(Equation 8)}$$

$$\left\{\frac{b(c+1)}{a\Delta\theta}\left(\frac{\theta - \theta_{soc}}{a\Delta\theta}\right)^c (1-a)\left(\exp\left[-b\left(\frac{\theta - \theta_{soc}}{a\Delta\theta}\right)^{c+1}\right]\right) + \right.$$
$$\left. \frac{b(e+1)}{d\Delta\theta}\left(\frac{\theta - \theta_{soc}}{d\Delta\theta}\right)^e d\left(\exp\left[-b\left(\frac{\theta - \theta_{soc}}{d\Delta\theta}\right)^{e+1}\right]\right)\right\}$$

$$P = \left(\frac{dQ}{d\theta} = \frac{1}{k-1}V\frac{dP}{d\theta}\right)\left(\frac{k-1}{k}\right)\left(\frac{d\theta}{dV}\right) \quad \text{(Equation 9)}$$

Herein, Q norm. as the normalized value represents the heat generation amount at the combustion time, a, b, and c represent the constants, and θ represents the combustion time. Further, $m_{fuel}$ represents a fuel amount before the main injection, a low heating value (LHV) represents the heating amount by the fuel amount, and a rate of heat release (ROHR) represents a heat generation rate.

As described above, the device of predicting a pressure of a diesel engine according to an exemplary embodiment of the present invention predicts the cylinder pressure before the pilot injection by using the specific heat ratio which varies according to the engine driving condition and predicts the cylinder pressure by the pilot injection and the main injection by using the Wiebe function to provide an environment which can predict the cylinder pressure of the diesel engine in real time without a separate pressure sensor.

The exemplary embodiments of the present invention described above can be implemented through the apparatus and the method and can be implemented through a program which realizes a function corresponding to a configuration of the exemplary embodiments of the present invention or a recording medium having the program recorded therein.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of predicting a cylinder pressure of a diesel engine by a pressure predicting device, the method comprising:
    predicting a pilot injection combustion pressure by pilot injection;
    predicting main combustion duration of main injection; and
    predicting a main injection combustion pressure after the main injection by using the pilot injection combustion pressure and the main combustion duration.

2. The method of claim 1, wherein the predicting of the main combustion duration includes:
    predicting an ignition delay time from an injection time of the main injection up to a combustion start time, and
    deriving the main combustion duration from the combustion start time up to a combustion end time of the main injection.

3. The method of claim 2, wherein
    the predicting of the main injection combustion pressure includes
    predicting a main combustion start pressure at the combustion start time by using the pilot injection combustion pressure and the ignition delay time.

4. The method of claim 3, wherein the predicting of the main injection combustion pressure further includes:
    deriving the main injection combustion pressure after the main injection by using a Wiebe function and deriving a maximum combustion pressure of the main injection at the combustion end time.

5. The method of claim 1, wherein the predicting of the pilot injection combustion pressure includes:
    predicting a pressure before the pilot injection by using an engine driving variable, and
    deriving the pilot injection combustion pressure by using the pressure before the pilot injection and the Wiebe function.

6. The method of claim 5, wherein
    in the predicting of the pressure before the pilot injection, a heat ratio which varies depending on an engine driving condition is predicted by using the engine driving variable and the pressure before the pilot injection is derived by using the predicted heat ratio.

7. The method of claim 6, wherein the engine driving variable includes at least one of engine driving variables having a boost pressure, an intake manifold temperature, an EGR, an air-fuel ratio (AF), a total fuel amount, a pilot fuel amount, a pilot injection time, a pilot injection duration, a main injection time, and a swirl ratio.

8. The method of claim 7, further including controlling the at least one of the engine driving variables by using the main injection combustion pressure by the main injection.

9. A device of predicting a pressure of a diesel engine comprising:
    a driving variable collecting device collecting engine driving variables of the diesel engine;
    a pressure predicting device predicting a pressure before pilot injection by using the engine driving variables and predicting a pilot injection combustion pressure by pilot injection and a main injection combustion pressure by main injection; and
    a control device controlling the main injection combustion pressure after the main injection to be predicted by predicting main combustion duration of the main injection.

10. The device of claim 9, wherein the engine driving variable includes at least one of engine driving variables having a boost pressure, an intake manifold temperature, an EGR, an air-fuel ratio (AF), a total fuel amount, a pilot fuel amount, a pilot injection time, a pilot injection duration, a main injection time, and a swirl ratio.

11. The device of claim 10, wherein the control device is configured to control the at least one of the engine driving variables by using the main injection combustion pressure.

12. The device of claim 10, wherein the control device includes an ignition delay time predicting device predicting an ignition delay time from an injection time of the main injection up to a combustion start time.

13. The device of claim 12, wherein the control device further includes a combustion duration predicting device predicting the main combustion duration from the combustion start time up to a combustion end time of the main injection.

14. The device of claim 13, wherein the pressure predicting device includes:
    a pilot injection combustion pressure predicting device predicting the pilot injection combustion pressure by using a pressure before the pilot injection, and
    a main injection combustion pressure predicting device predicting a main injection combustion pressure by the main injection.

15. The device of claim 14, wherein the pilot injection combustion pressure predicting unit predicts a heat ratio which varies depending on an engine driving condition by using the engine driving variable and derives the pressure before the pilot injection by using the predicted heat ratio.

16. The device of claim 14, wherein the main injection combustion pressure predicting unit derives a main combustion start pressure at the combustion start time by using the pilot injection combustion pressure and the ignition delay time.

17. The device of claim 14, wherein the main injection combustion pressure predicting unit derives a maximum combustion pressure of the main injection at the combustion end time by using a Wiebe function.

* * * * *